US012718505B2

(12) United States Patent
Jahn et al.

(10) Patent No.: US 12,718,505 B2
(45) Date of Patent: Aug. 25, 2026

(54) FEEDBACK LOOP COMBINING AUGMENTED REALITY AND VIRTUAL REALITY TO FACILITATE INTERACTIONS IN THE VIRTUAL WORLD AND THE PHYSICAL WORLD

(71) Applicant: The Aerospace Corporation, El Segundo, CA (US)

(72) Inventors: Trevor M. Jahn, Marina Del Rey, CA (US); Austin R. Baird, Inglewood, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 465 days.

(21) Appl. No.: 18/452,129

(22) Filed: Aug. 18, 2023

(65) Prior Publication Data

US 2025/0061671 A1 Feb. 20, 2025

(51) Int. Cl.
*G06F 3/04815* (2022.01)
*G01C 21/20* (2006.01)
(Continued)

(52) U.S. Cl.
CPC .............. *G06T 19/20* (2013.01); *G01C 21/20* (2013.01); *G06F 3/04815* (2013.01);
(Continued)

(58) Field of Classification Search
CPC ................. G06T 19/20; G06T 2200/24; G06T 2219/004; G06T 2219/2012;
(Continued)

(56) References Cited

U.S. PATENT DOCUMENTS 7,479,967 B2 1/2009 Bachelder et al.
8,040,361 B2 10/2011 Bachelder et al.
(Continued)

FOREIGN PATENT DOCUMENTS

WO 2013085639 A1 6/2013

OTHER PUBLICATIONS

Boboc, et al., "Augmented Reality in Cultural Heritage: An Overview of the Last Decade of Applications", Applied Sciences, 2022, 12, 9859.

(Continued)

*Primary Examiner* — Anil K Bhargava
(74) *Attorney, Agent, or Firm* — LeonardPatel PC

(57) ABSTRACT

Combining augmented reality (AR), virtual reality (VR), and photogrammetry to facilitate interactions with the physical world is disclosed. Images may be collected through various means (e.g., images taken by drones, ground-based photography, satellite imaging, etc.) and used to construct a three-dimensional (3D) model representation of the real world. This virtual environment can then be experienced by users in either a computing system (e.g., a desktop computer, laptop computer, smart phone, tablet, etc.) or a VR interface (e.g., a headset). The users can create various annotations, such as voice recordings, images, text, etc., and place these annotations in the virtual 3D model of the real world. These annotations are linked to the physical world via a coordinate system. AR "explorers" and VR users can then interact with one another via geographically aligned AR and VR models.

38 Claims, 14 Drawing Sheets

(51) Int. Cl.
*G06F 3/0482* (2013.01)
*G06T 19/20* (2011.01)

(52) U.S. Cl.
CPC ........ *G06F 3/0482* (2013.01); *G06T 2200/24* (2013.01); *G06T 2219/004* (2013.01); *G06T 2219/2012* (2013.01); *G06T 2219/2016* (2013.01)

(58) Field of Classification Search
CPC ............ G06T 2219/2016; G01C 21/20; G06F 3/04815; G06F 3/0482
See application file for complete search history.

(56) References Cited

U.S. PATENT DOCUMENTS 9,071,709 B2 6/2015 Wither et al.
9,215,293 B2 12/2015 Miller
9,471,934 B2 * 10/2016 Belimpasakis .... G06Q 30/0261
9,488,488 B2 11/2016 Waldman
9,858,727 B2 * 1/2018 Ramachandran ...... G06V 20/20
11,210,851 B1 12/2021 Nussbaum et al.
11,682,177 B2 * 6/2023 Jovanovic ............... G01S 17/89 345/419
11,756,272 B2 * 9/2023 Brent .................... G06T 19/006 345/633
12,223,596 B2 * 2/2025 Fleisher .................. G06T 19/20
12,249,122 B2 * 3/2025 Sharma .............. G02B 27/0103
2007/0035561 A1 2/2007 Bachelder et al.
2010/0245387 A1 9/2010 Bachelder et al.
2011/0199479 A1 8/2011 Waldman
2012/0249586 A1 10/2012 Wither et al.
2013/0117377 A1 5/2013 Miller
2013/0311868 A1 11/2013 Monney et al.
2015/0138230 A1 * 5/2015 Uusitalo .................. G09G 5/00 345/629
2016/0133230 A1 5/2016 Daniels et al.
2016/0240011 A1 8/2016 Fedosov et al.
2019/0317974 A1 * 10/2019 Chamberlin ............ G06F 16/29
2022/0011924 A1 * 1/2022 Pahud ..................... G06T 19/20
2022/0405913 A1 12/2022 Subramanian et al.
2023/0136597 A1 * 5/2023 Thiel ...................... H04N 7/157 345/419
2023/0157762 A1 * 5/2023 Braido ................... A61B 34/37 600/424
2023/0169729 A1 * 6/2023 Fleisher .................. G06T 17/20 345/419
2023/0260218 A1 * 8/2023 Li ........................... G06T 17/05 345/419
2023/0410384 A1 * 12/2023 Pajouh ...................... G06T 7/73
2024/0046619 A1 * 2/2024 Sharma .............. G02B 27/0103
2024/0114226 A1 * 4/2024 Berkovich ............. H04N 23/57
2024/0249476 A1 * 7/2024 Shreve .................... G06T 7/194
2024/0428543 A1 * 12/2024 Thiel ..................... G06T 15/205

OTHER PUBLICATIONS

Boulos, et al., "From Urban Planning and Emergency Training to Pokemon Go: Applications of Virtual Reality GIS (VRGIS) and Augmented Reality GIS (ARGIS) in Personal, Public and Environmental Health", Int. J Health Geogr (2017) 16:7.

Ortiz-Fernandez, et al., "Smart Artificial Markers for Accurate Visual Mapping and Localization", Sensors 2021, 21, 625.

Portales, et al., "Augmented Reality and Photogrammetry: A Synergy to Visualize Physical and Virtual City Environments", ISPRS Journal of Photogrammetry and Remote Sensing 64 (2010) 134-142.

Rao, et al., "A Mobile Outdoor Augmented Reality Method Combining Deep Learning Object Detection and Spatial Relationships for Geovisualization", Sensors 2017, 17, 1951.

* cited by examiner

FIG. 2A
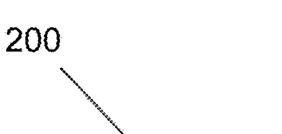
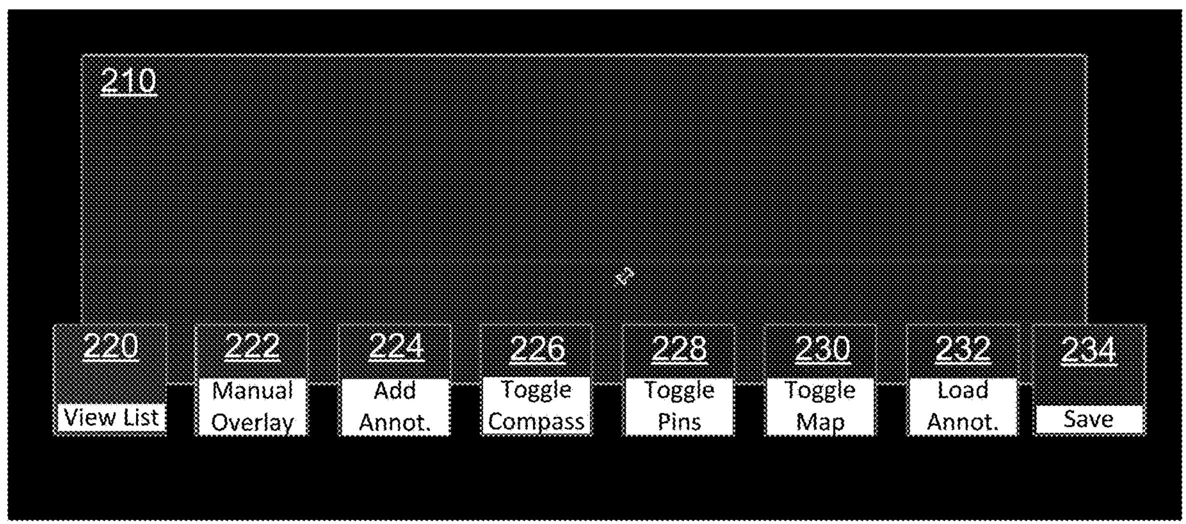

| Name | Created | Origin | Coordinates |
|---|---|---|---|
| Annotation 1 | MM/DD/YYYY HH:MM | VR | XX.XXX, XX.XXXX |
| Annotation 2 | MM/DD/YYYY HH:MM | VR | XX.XXX, XX.XXXX |
| Annotation 3 | MM/DD/YYYY HH:MM | AR | XX.XXX, XX.XXXX |
| Annotation 4 | MM/DD/YYYY HH:MM | AR | XX.XXX, XX.XXXX |
| Annotation n | MM/DD/YYYY HH:MM | AR | XX.XXX, XX.XXXX |

270

FIG. 3A
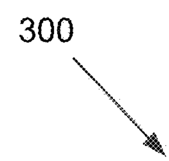
300
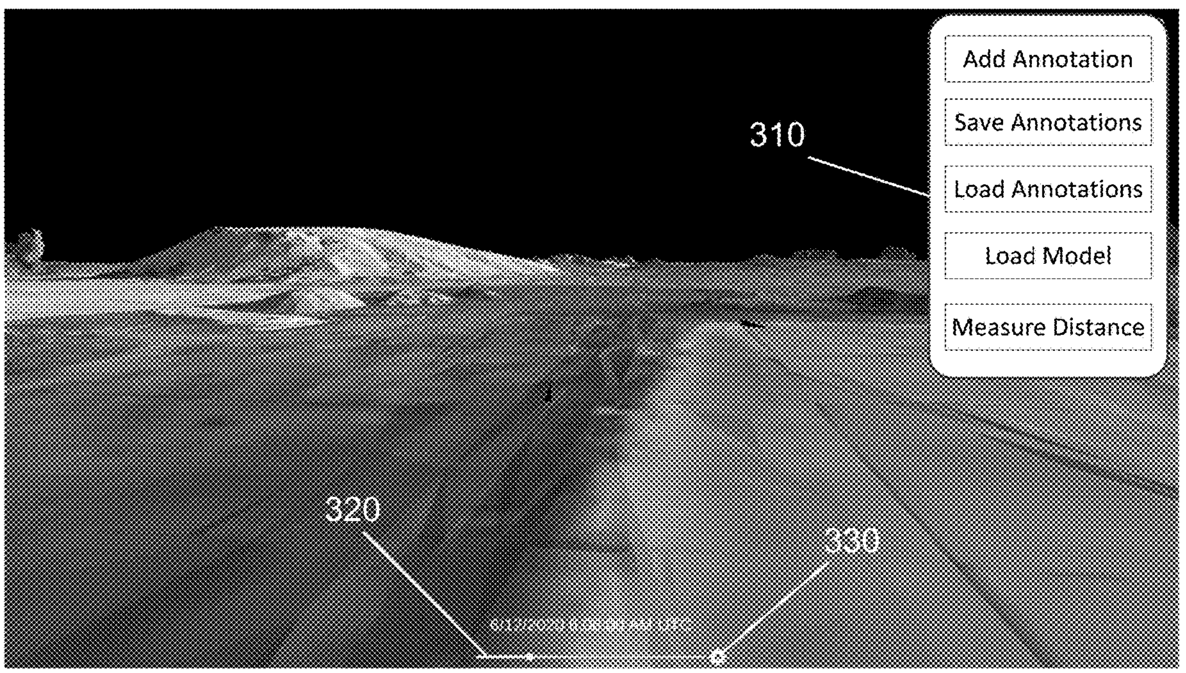
Add Annotation
Save Annotations
Load Annotations
Load Model
Measure Distance
310
320
330

FIG. 3B
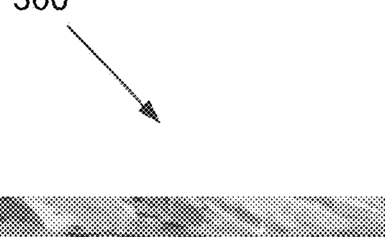
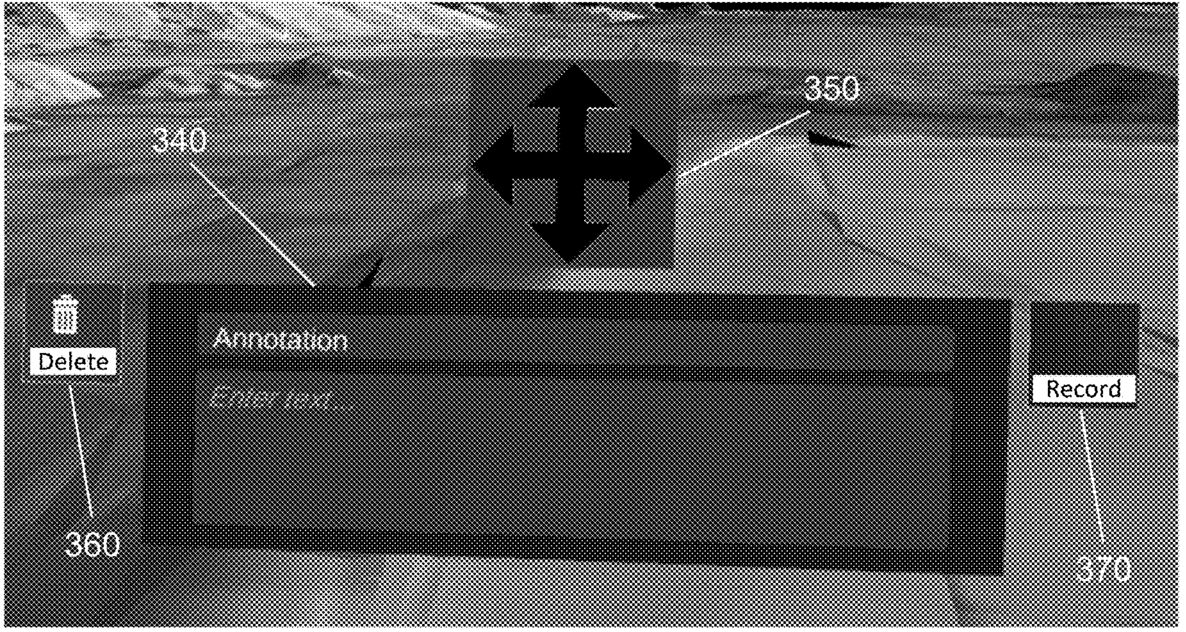

FIG. 4A
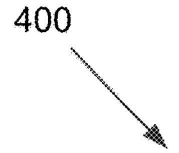
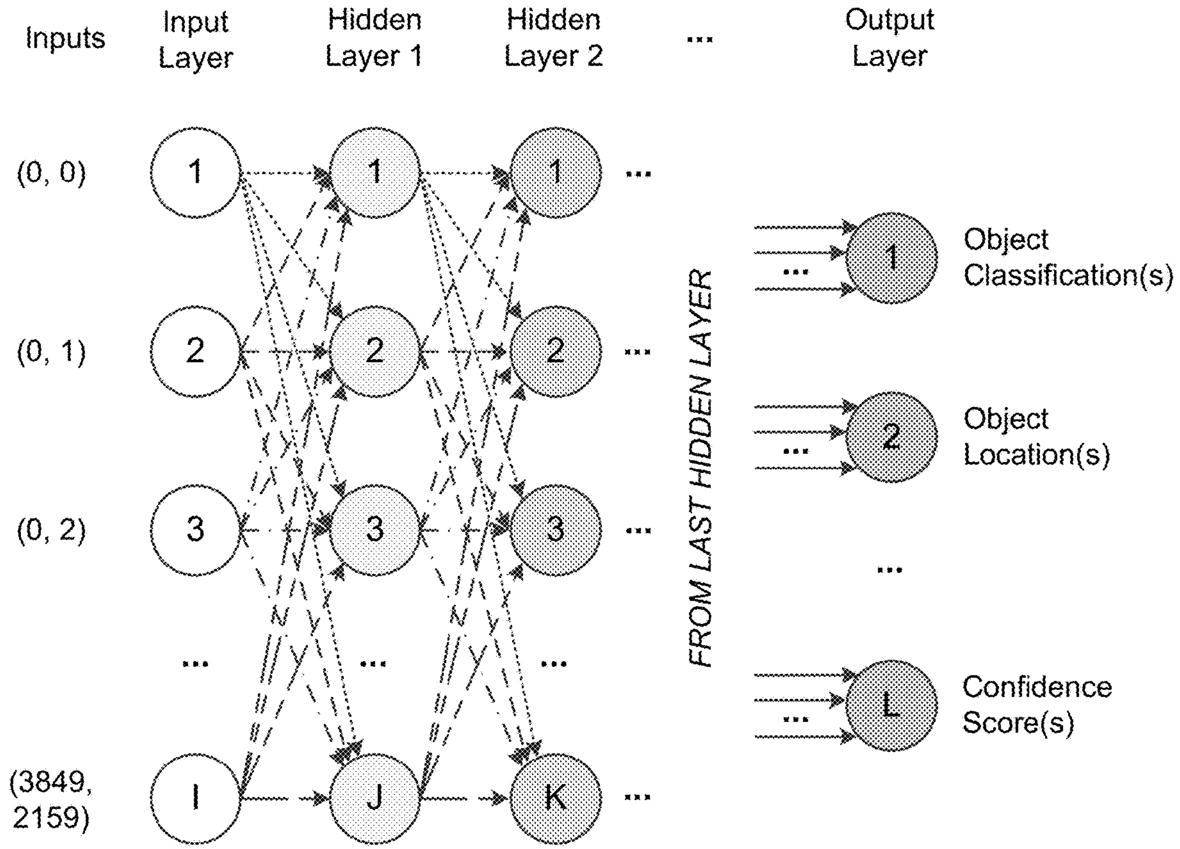

500
Images / Video
Real World Model(s)
Virtual World Model(s)
Geofencing Constraints
510
Train AI/ML Model(s)
520
Review Results
530
Threshold Met?
540
NO
Supplement Training Data and/ or Modify Reward Function
550
YES
Test on Evaluation Data
560
Threshold Met?
570
NO
YES
Deploy AI/ML Model(s)
580

FIG. 6
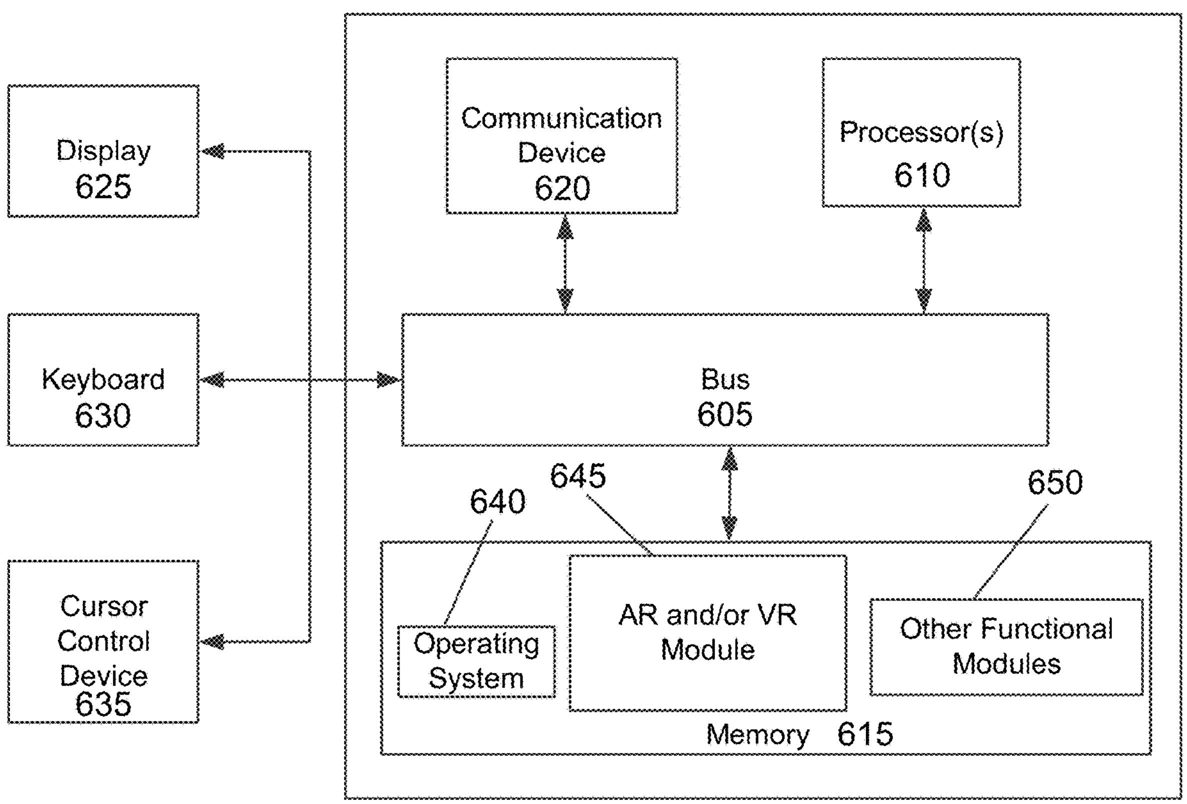

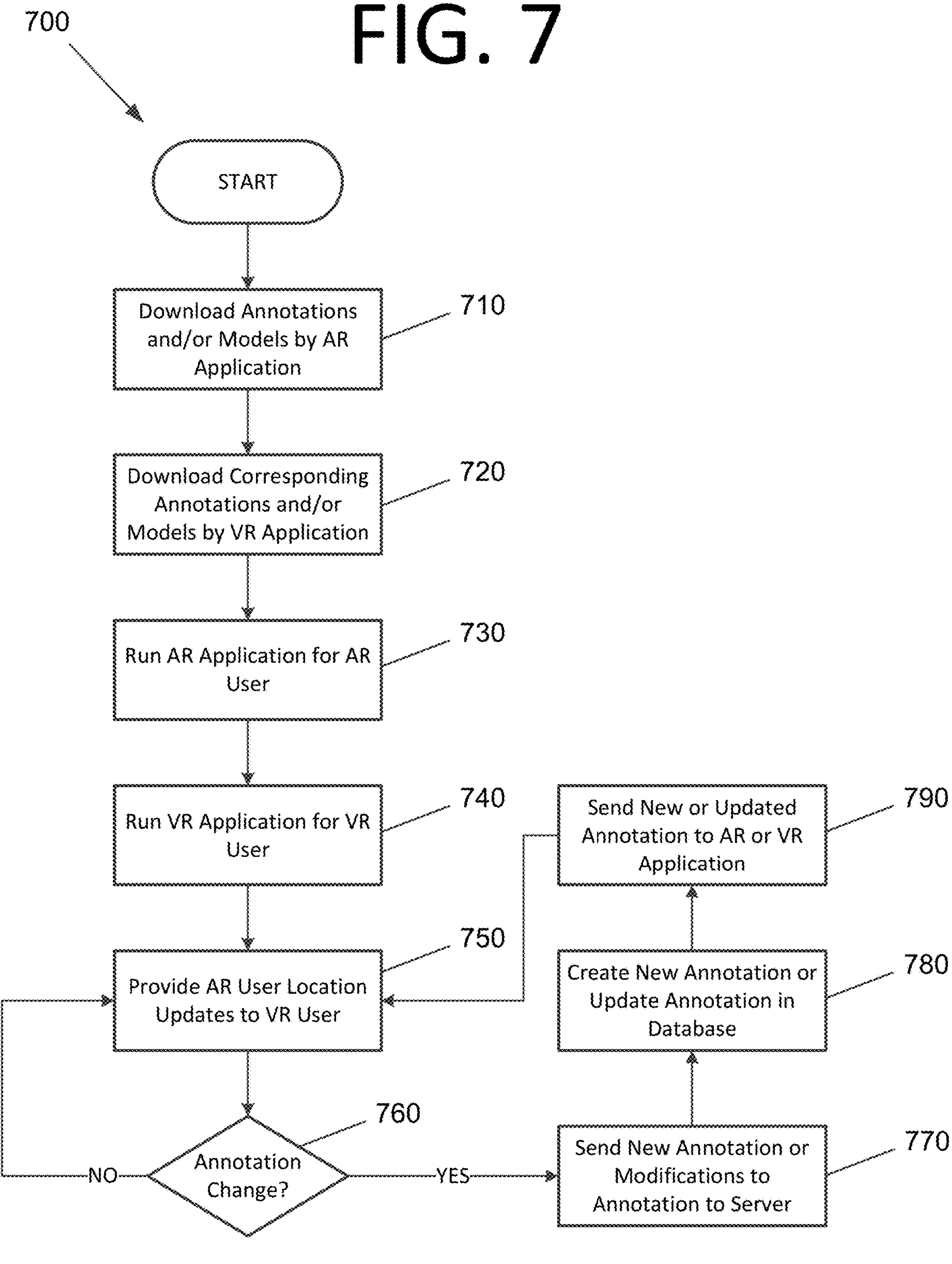
FIG. 7
700
START
Download Annotations and/or Models by AR Application
710
Download Corresponding Annotations and/or Models by VR Application
720
Run AR Application for AR User
730
Run VR Application for VR User
740
Provide AR User Location Updates to VR User
750
Annotation Change?
760
NO
YES
Send New Annotation or Modifications to Annotation to Server
770
Create New Annotation or Update Annotation in Database
780
Send New or Updated Annotation to AR or VR Application
790

800
START
Run Instance of AR Application
810
Display Local Annotations
820
Generate New Annotation or Modify Existing Annotation
830
Send New Annotation or Modifications to Annotation to Server
840
Move Annotation and/or Change Scale
850
Send Location Change and/or Scaling Information to Server
860
Send AR User Location Updates
870
Update AR Application Annotations
880

FIG. 9
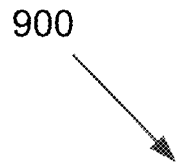
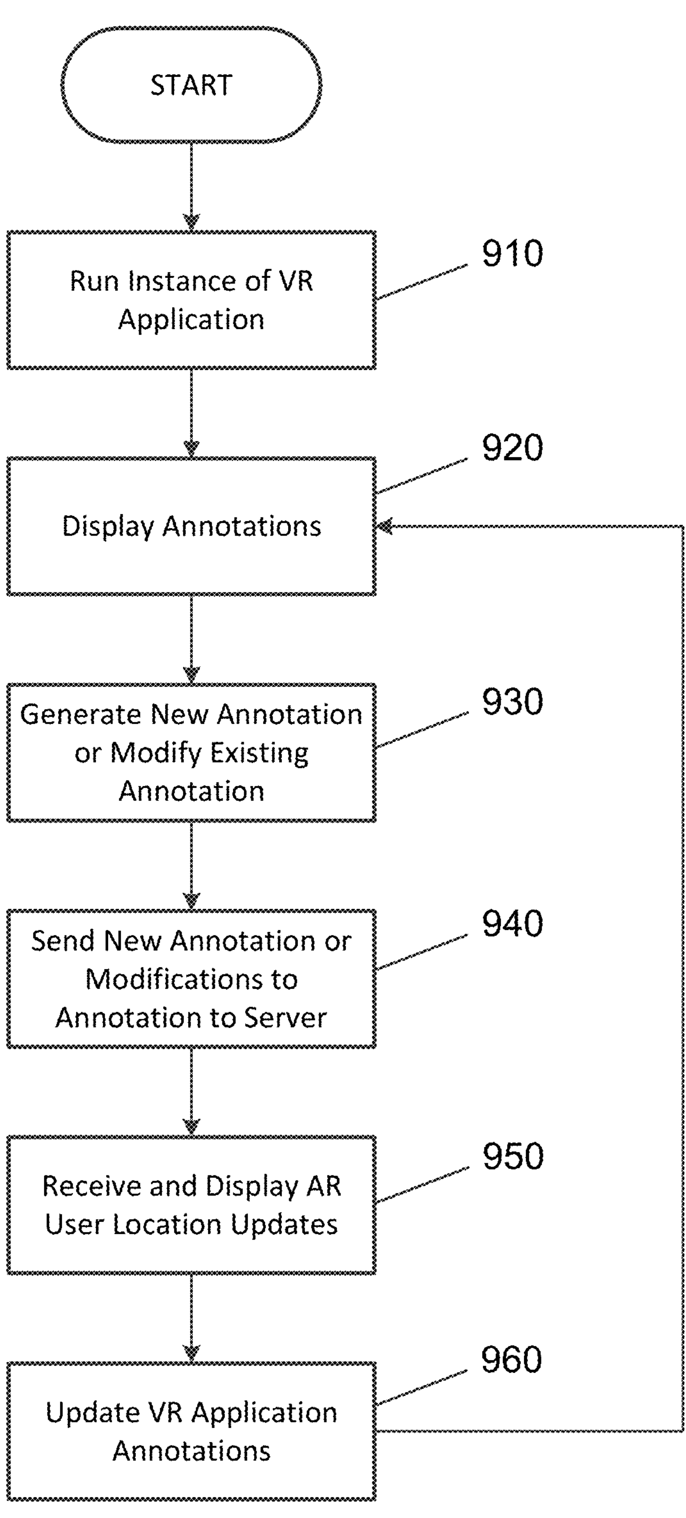

FEEDBACK LOOP COMBINING AUGMENTED REALITY AND VIRTUAL REALITY TO FACILITATE INTERACTIONS IN THE VIRTUAL WORLD AND THE PHYSICAL WORLD

FIELD

The present invention generally relates to electronics and artificial intelligence, and more specifically, to a feedback loop combining augmented reality (AR) and virtual reality (VR) to facilitate interactions in the virtual world and the physical world.

BACKGROUND

AR and VR technologies exist that allow collaboration between multiple users in a virtual world. Global positioning system (GPS) coordinates may be used for object locations in AR, and annotations may be used in combined AR and VR systems. However, the annotations and markers are not common to both the AR and VR environments, nor are voice or video annotations provided. Furthermore, existing technologies lack a feedback loop between users working in AR and VR in tandem. Accordingly, an improved and/or alternative approach to combined AR and VR systems may be beneficial.

SUMMARY

Certain embodiments of the present invention may provide solutions to the problems and needs in the art that have not yet been fully identified, appreciated, or solved by current augmented reality and virtual reality technologies. For example, some embodiments of the present invention pertain to a feedback loop combining AR and VR to facilitate interactions in the virtual world and the physical world.

In an embodiment, a computer-implemented method for providing AR with a feedback loop includes running an instance of an AR application, by a computing system. The computer-implemented method also includes displaying one or more annotations in the AR application linked to one or more respective real world locations as holographic projections on a display of the computing system, by AR application. The one or more annotations are linked to the one or more respective real world locations by a coordinate system. The one or more annotations are also associated with corresponding locations in a virtual reality (VR) application.

In another embodiment, a non-transitory computer-readable medium stores a computer program for providing AR with a feedback loop. The computer program is configured to cause at least one processor to run an instance of an AR application and display one or more annotations linked to one or more respective real world locations as holographic projections. The one or more annotations are linked to the one or more respective real world locations by a coordinate system. The one or more annotations are also associated with corresponding locations in a VR application and visible at the corresponding locations in both the AR application and the VR application. The one or more annotations include a voice recording, an image, a text description, a title, or any combination thereof.

In yet another embodiment, a computing system includes memory storing computer program instructions for providing AR with a feedback loop and at least one processor configured to execute the computer program instructions. The computer program instructions are configured to cause the at least one processor to display one or more annotations in an AR application linked to one or more respective real world locations as holographic projections. The computer program instructions are also configured to cause the at least one processor to generate a new annotation or update an annotation of the one or more annotations. The computer program instructions are further configured to cause the at least one processor to send information pertaining to the generated new annotation or the updated annotation to a server accessible by at least one other instance of the AR application, at least one instance of a VR application, or both. The one or more annotations are linked to the one or more respective real world locations by a coordinate system. The one or more annotations are also associated with corresponding locations in the VR application and visible at the corresponding locations in both the AR application and the VR application.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2A is a screenshot illustrating an AR explorer interface, according to an embodiment of the present invention.

FIG. 2C is a screenshot illustrating a View List interface that displays a list of annotations in the current session, according to an embodiment of the present invention.

FIG. 3A is a screenshot illustrating a VR user interface, according to an embodiment of the present invention.

FIG. 3B illustrates the VR user interface with an annotation, according to an embodiment of the present invention.

FIG. 4A illustrates an example of a neural network that has been trained to augment AR and/or VR, according to an embodiment of the present invention.

FIG. 6 is an architectural diagram illustrating a computing system configured to provide combined AR and/or VR with a feedback loop, or aspects thereof, according to an embodiment of the present invention.

FIG. 7 is a flowchart illustrating a process for providing combined AR and VR with a feedback loop, or aspects thereof, according to an embodiment of the present invention.

FIG. 9 is a flowchart illustrating a process for providing VR with a feedback loop, or aspects thereof, according to an embodiment of the present invention.

Unless otherwise indicated, similar reference characters denote corresponding features consistently throughout the attached drawings.

DETAILED DESCRIPTION OF THE EMBODIMENTS

Figure 1:
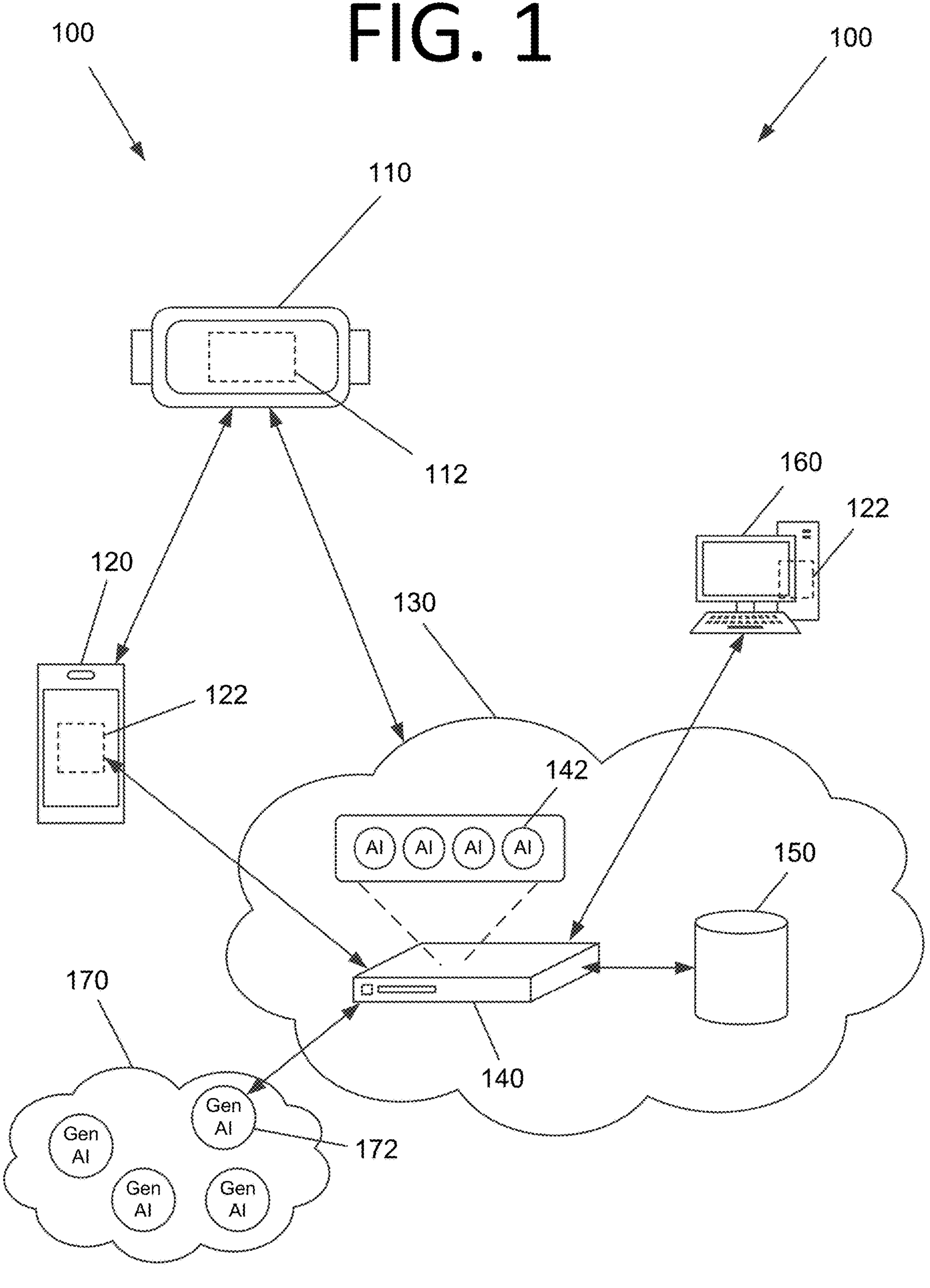
FIG. 1 is an architectural diagram illustrating a system configured to provide combined AR and VR with a feedback loop, according to an embodiment of the present invention.

Some embodiments pertain to a feedback loop combining AR and VR to facilitate interactions in the virtual world and the physical (real) world. Images may be collected through various means (e.g., images taken by drones, ground-based photography, satellite imaging, etc.) and used to construct a three-dimensional (3D) model representation of the real world. This virtual environment can then be experienced by users in either a computing system (e.g., a desktop computer, laptop computer, smart phone, tablet, etc.) or a VR interface (e.g., a headset, a mobile phone, a tablet, etc.). The users can create various annotations, such as voice recordings, images, text, etc., and place these annotations in the virtual 3D model of the real world.

These annotations are linked to the physical world via a coordinate system, such as GPS coordinates. For instance, in some embodiments, GPS coordinates for annotations are stored in a database. These annotations may ultimately be converted into a left handed coordinate system such as the Unity™ coordinate system, a right handed coordinate system such as the Blender™ coordinate system, or any other non-GPS coordinate system without deviating from the scope of the invention, to display the annotations to the user, but this position is not necessarily stored in the database since it will change depending on where the AR application is launched from or where the "reference anchor point" is. The geocoordinates, however, typically stay consistent.

Once annotations have been uploaded to the database in some embodiments, users can don an AR headset as "explorers" and view holographic projections of the annotations in the real world since they are tied to the virtual world by coordinates. The virtual world and the real world can also be aligned using a synthetic square marker (e.g., an ArUco marker) anchor point in some embodiments, or the virtual world and the real world can be manually aligned. GPS alignment may be preferred in some embodiments, however.

New 3D models of the real world can be spliced together to increase the fidelity of the virtual world model. The annotations created by users in the virtual world can be replied to by explorers in the real world in some embodiments. New annotations can be made by explorers in the real world for users to see in the virtual world. Thus, both AR and VR users may work collaboratively.

Annotations can also be interacted with in multiple ways in some embodiments. Explorers may leave text memos, voice recordings, or videos on annotations. This creates a back-and-forth form of communication between users interacting with the virtual (VR) world and explorers in the real (AR) world. These features flow in a feedback loop. As the explorers generate more data from the physical world, the data is processed. The virtual users can analyze and annotate the data, and then flow the data back out to the explorers.

Virtual users are presented with a 3D model of the real world. A base model may be provided from a source such a Google Earth™ and/or other satellite/aircraft-provided imagery source(s). The initial fidelity of the 3D model depends on the quality/fidelity of the initial source images. Higher resolution images can be captured in the field by drones, handheld cameras, smart phones, wearable cameras, rovers, etc. These images may be overlapped with one another and with the images from the initial imagery source (s) to increase the fidelity of the virtual model via photogrammetry. For instance, photogrammetry applications such as Pix4D™, Autodesk ReCap™, or others may be used to incorporate the higher resolution imagery into the virtual models. GPS locations can be tied to images to help to identify where they should be incorporated into the virtual models. The higher fidelity images may be "raised" over the lower fidelity images to improve the resolution of the respective portions of the virtual model. Alternatively, the lower resolution images for those locations may be removed from the model.

VR users can provide annotations, which may appear as poster-type elements with a title and a box for text in some embodiments. Voice recordings and/or videos may also be attached. When placed in the VR model, these will appear in the appropriate location in the AR model as well. For instance, a VR scientist may leave an annotation for an astronaut to explore a desired feature on the moon, Mars, etc. AR explorers may also modify and/or provide text for annotations using an AR keyboard in some embodiments.

The AR user interface (UI) may have various tools and options for use in the real world. For instance, a map may be toggled on and off (explorer view 3D map). In some embodiments, the map provides an aerial view with the AR explorer's location and the locations of features and associated annotations. In certain embodiments, the AR explorer may be able to grab the map with two fingers, move the map around, and manipulate the map. In some embodiments, the annotations created by VR users appear as pins on the 3D map floating in front of the user.

The pins may be color coded to indicate certain statuses. For instance, a pin and/or annotation for a location, feature, or object that an AR explorer has not visited yet may appear in one color, and then change color when the AR explorer visits that location. The annotation may also change color when a message has been added by an AR explorer, a VR user, or both. The changes may appear in both the AR and VR models.

In some embodiments, the annotations and/or pins appear as holograms having sizes that correspond to the distances from the AR explorer. In other words, the holograms may be smaller when they are further away and increase in size as the AR explorer approaches them. Since distant holograms may be difficult to see, some embodiments include a compass that can be toggled by the AR explorer and allows the AR explorer to toggle to an annotation that the explorer wants to view and navigate to the location of the annotation (e.g., by being guided by a 3D arrow that appears in front of the explorer). In certain embodiments, multiple annotations may be strung together as waypoints that guide the explorer to the next annotation and allow locations associate with the annotations to be visited in order.

In some embodiments, a menu may be provided in the UI that allows the AR explorer to view the annotations in the environment. The menu may include searchable annotation names, the maker (e.g., AR explorer or VR user) of the annotation, the coordinates of the annotation, when the annotation was made, the current distance to the annotation, the relative location of the annotation, etc. This may allow AR explorers to search annotations available in the model choose and/or prioritize which annotations to visit. See FIG. 2D, for example.

The real, AR world and the virtual world should be aligned to ensure that locations for annotations in the models for VR users and AR explorers match. In some embodiments, synthetic square markers such as ArUco markers may be used as anchor points. These are binary square markers that are somewhat like quick response (QR) codes. Since the location of the marker in the virtual world is known, if an AR explorer sees that marker in the real world, the explorer knows the location in the real world versus the virtual world. In other words, the marker aligns annotations around the AR explorer to ensure that the annotations appear in the appropriate location in both the AR and VR models. This may be useful for a museum plaque or another object of interest, for example. An ArUco marker or other synthetic square marker for such a physical object could serve as an anchor for both the virtual world and the real world.

In some embodiments, manual alignment may be used. If the location of where an annotation should be in the real world is known and you want the annotation to be positioned accurately relative to the virtual world, the AR explorer may toggle a manual alignment button and physically select where the annotation should be in the real world. The AR explorer can position the annotation relative to him or herself and in some embodiments, pivot the relative positions of the remaining annotations using a slide bar, for example. Once the position of a single annotation is set, the slide bar may be used to rotate the remaining annotations around the set annotation so all annotations are placed correctly relative to the set (root) annotation. If the scale is off between the virtual world and the real world, the AR explorer can change the location of proximate annotations (or in some embodiments, all annotations in the model) by zooming in or out and/or rotating the annotations.

For example, consider the case where a VR user would like to place an annotation on a plaque in a monument or a museum. The alignment in the real world may not be accurate. An AR explorer may visit the plaque, choose the manual alignment option, move the annotation over the plaque, and use the slide bar to rotate all other annotations until they line up. Then, the AR explorer may scale the annotations around the plaque until they are separated from one another by the correct distances. In other words, this ensures that the annotations in the area are in the correct positions relative to one another.

To track where AR explorers actually are, a coordinate system may be used relative to the virtual world. This may be performed by taking an initial reference point and its GPS coordinates, and then using an AR explorer's relative position from this point to determine the current GPS coordinates of the AR explorer. This method may be used for both displaying an AR explorer's current position on a 3D map and for placing annotations in the AR environment. The AR explorer's real world position can then also be sent to VR users in the virtual world to see the AR explorer's position as it updates.

In some embodiments, GPS may not be required to continue to map the AR explorer's location to the virtual world. The AR user may ping his or her location once to get a reference. After that, sensors in the AR headset, such as a magnetometer, accelerometer/inertial measurement unit (IMU), gyroscope, processing of images of visual input that the user is moving past etc., may be used to update the AR explorer's position in the VR model.

In some embodiments, 3D models may be used as part of or in lieu of annotations. For instance, 3D models of objects (e.g., a car, a plane, a character, etc.) may be placed in the real world as holograms for AR explorers. The programs (e.g., code sets for the holograms paired with the AR models themselves) may be stored in a database. In certain embodiments, the 3D models may have animations and/or may move around to different locations. Geofencing may be provided for the 3D models to constrain 3D models to respective areas, ensure that they do not run through real world objects, ensure that they are obscured if behind real world objects, etc. In some embodiments, the holograms may have associated audio that gets louder or quitter as the AR explorer moves toward or away from the hologram, respectively. In some embodiments, holograms may have non-fungible tokens (NFTs) where holograms are build on the blockchain, one individual owns the hologram, and the hologram is the only one appearing at a certain location and within a certain proximity thereto.

In some embodiments, an application window may appear for both AR explorers and VR users, where the application window is tied to GPS coordinates or some other coordinate system. For instance, for a videoconferencing application, a hologram of a window with video panes for respective users in AR and/or VR may appear to respective AR explorers. VR users would also be able to view an interface for the application on their computing systems.

In some embodiments, holograms may have AI and may solve problems. For instance, holograms could be provided with real world objectives and use AI/ML model(s) to accomplish the objectives. AI holograms may attempt to navigate the real world to find paths to locations, operate as a swarm to accomplish group objectives, etc.

FIG. 1 is an architectural diagram illustrating a system 100 configured to provide combined AR and VR with a feedback loop, according to an embodiment of the present invention. An AR headset 110 includes an AR application 112 that provides an AR interface for an explorer in the real world. AR application 112 includes or has access to 3D models of the real world that may provide annotations, holograms, and the like that correspond to locations proximate to the AR explorer in the real world. AR application 112 may allow AR explorers to add or modify annotations, provide a 3D map and a menu that allows AR explorers to find and navigate to annotations and/or other holograms, leave text memos, create voice recordings, and/or create videos on annotations, provide the AR explorer's current location, align the locations of annotations in the AR world with the VR world, provide images to improve the fidelity of the VR models, interact with holograms (e.g., via a camera of AR headset 110), etc. Sensors of AR headset may be used by AR application 112 to provide location changes so VR users can see the updated location of the AR explorer as the AR explorer moves around an environment.

In some embodiments, AR explorers may use a smart phone 120 to capture high resolution images of the environment so the fidelity of the VR model can be improved and/or the images can be incorporated into annotations. Smart phone 120 may also run a VR application 122 so the AR explorer can see what the VR users see. Alternatively, VR application 122 may be run on headset 110, and the AR explorer may toggle between AR application 112 and VR application 122.

AR application 112 and VR application 122 send communications to and receive communications from a server 140 via a network 130 (e.g., a local area network (LAN), a mobile communications network, a satellite communications network, the Internet, any combination thereof, etc.). In some embodiments, server 140 is part of a public cloud architecture, a private cloud architecture, a hybrid cloud architecture, etc. In certain embodiments, server 140 may host multiple software-based servers on a single computing system. In certain embodiments, multiple servers are used.

Cloud server 140 includes AI/ML models 142 that have been trained to perform certain functions. For example, a computer vision (CV) model may be used to process video images sent from AR application 112 to server 140 and identify objects therein. These objects may then be labeled with holograms in AR application 112. As discussed above, one or more of AI/ML models 142 may be models for holograms shown by AR application 112. These holograms may move, solve problems, generate chat text or speech, etc. based on output from such models. The models, annotations, VR and AR world models, etc. may be stored in a database 150.

The models may have animations associated with them in some embodiments. Along with these animations, the models may also have behaviors defined for them, such as path finding algorithms. These names of the associated path finding behaviors may be stored with the models, while the logic for executing the behaviors may reside in the AR or VR application itself. After a model and behavior is selected from the database, a user can select a destination for a model in their environment, or specify that the model roams within a certain boundary. The combination of these models, path finding behaviors, and objectives encompass a simulation that can be run in AR or VR.

Consider the example of pathfinding through terrain for an AR explorer. Objectives may be stored in the code for the hologram. The AR explorer may download hologram files and have pre-saved commands. If the hologram can run, jump up and down, hover, etc., the commands may instruct the hologram to navigate to a point using the shortest distance, run faster, jump higher, etc.

In some embodiments, the AR explorer may specify how he or she wants the hologram model to move around in the world. For instance, the AR explorer may specify that the hologram is able to interact with other models, that it ignores other models, that it tries to avoid walls, stays in the ground, performs collision detection for itself versus objects in the environment and other models, etc. In some embodiments, cameras may be used to create 3D avatars of people. These 3D avatars could then be used along with dialogue from that person analyzed by a generative AI model to create an AI version of that person that would speak similarly. If included in the AR environment as a hologram, this AI person could accompany the AR explorer as he or she moves around. This could also be done for a pet, a movie character, etc.

Computing system(s) 160 for VR user(s) run VR application 122, which also communicates with server(s) 140. VR application 122 runs models of the virtual world. VR application 122 also displays and updates locations of AR explorers, allows VR users to create/change annotations, aligns locations provided by AR application 112 in the virtual world, etc.

In some embodiments, generative AI models are used. Generative AI can generate various types of content, such as text, imagery, audio, and synthetic data. various types of generative AI models may be used, including, but not limited to, large language models (LLMs), generative adversarial networks (GANs), variational autoencoders (VAEs), transformers, etc. These models may be part of AI/ML models 142 hosted on server 140. For instance, the generative AI models may be trained on a large corpus of textual information to perform semantic understanding, to understand the nature of what is present on a screen from text, and the like. In certain embodiments, generative AI models 172 provided by an existing cloud ML service provider 170, such as OpenAI®, Google®, Amazon®, Microsoft®, IBM®, Nvidia®, Facebook®, etc., may be employed and trained to provide such functionality. In generative AI embodiments where generative AI model(s) 172 are remotely hosted, server 140 can be configured to integrate with third-party APIs, which allow server 140 to send a request to generative AI model(s) 172 including the requisite input information and receive a response in return. Such embodiments may provide a more advanced and sophisticated user experience, as well as provide access to state-of-the-art natural language processing (NLP) and other ML capabilities that these companies offer.

FIG. 2A is a screenshot illustrating an AR explorer interface 200, according to an embodiment of the present invention. The AR explorers interact with the menu interface in some embodiments by pressing buttons with their fingers or through voice commands. An annotation 210 is also shown. A View List button 220 displays a list of each annotation in the current session, along with the annotation coordinates, date of creation, and where the annotation originated from (AR or VR user). See FIG. 2C. An Enable Manual Overlay button 222 allows the user to manually set the positions of annotations. An Add Annotation button 224 creates an annotation that the AR explorer can write a title and description for via a virtual keyboard or through voice memos. A Toggle Compass button 226 displays a marker that points to an indicated annotation to guide a user to a selected annotation. A Toggle Pins button 228 either displays or hides pins on the virtual AR map indicating the location of annotations and the AR explorer's current position on the map. A Toggle Map button 230 hides or displays the AR map. A Load Annotations button 232 allows a user to select a data file containing a list of annotations to be displayed. A Save button 234 allows a user to save the current session to a data file locally on the headset.

Figure 2B:
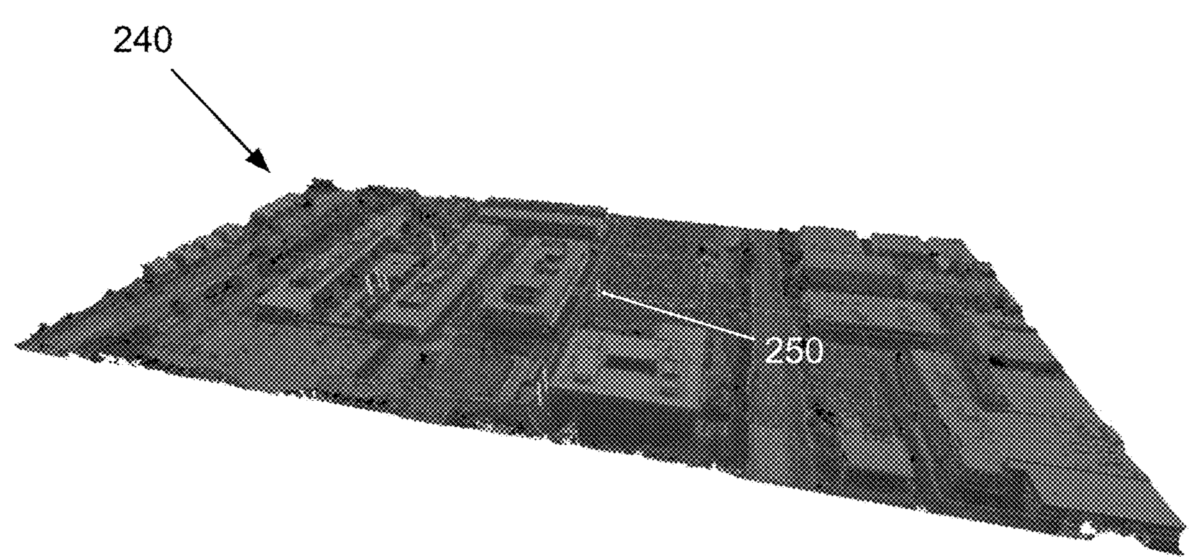
FIG. 2B illustrates an AR explorer map that may be superimposed over the real world, according to an embodiment of the present invention.

FIG. 2B illustrates an AR explorer map 240 that may be superimposed over the real world, according to an embodiment of the present invention. AR explorer map 240 includes pins 250 that indicate the location of annotations. In some embodiments, pins 250 may indicate the locations of AI/ML-driven holograms that the AR explorer can visit and interact with.

Figure 2D:
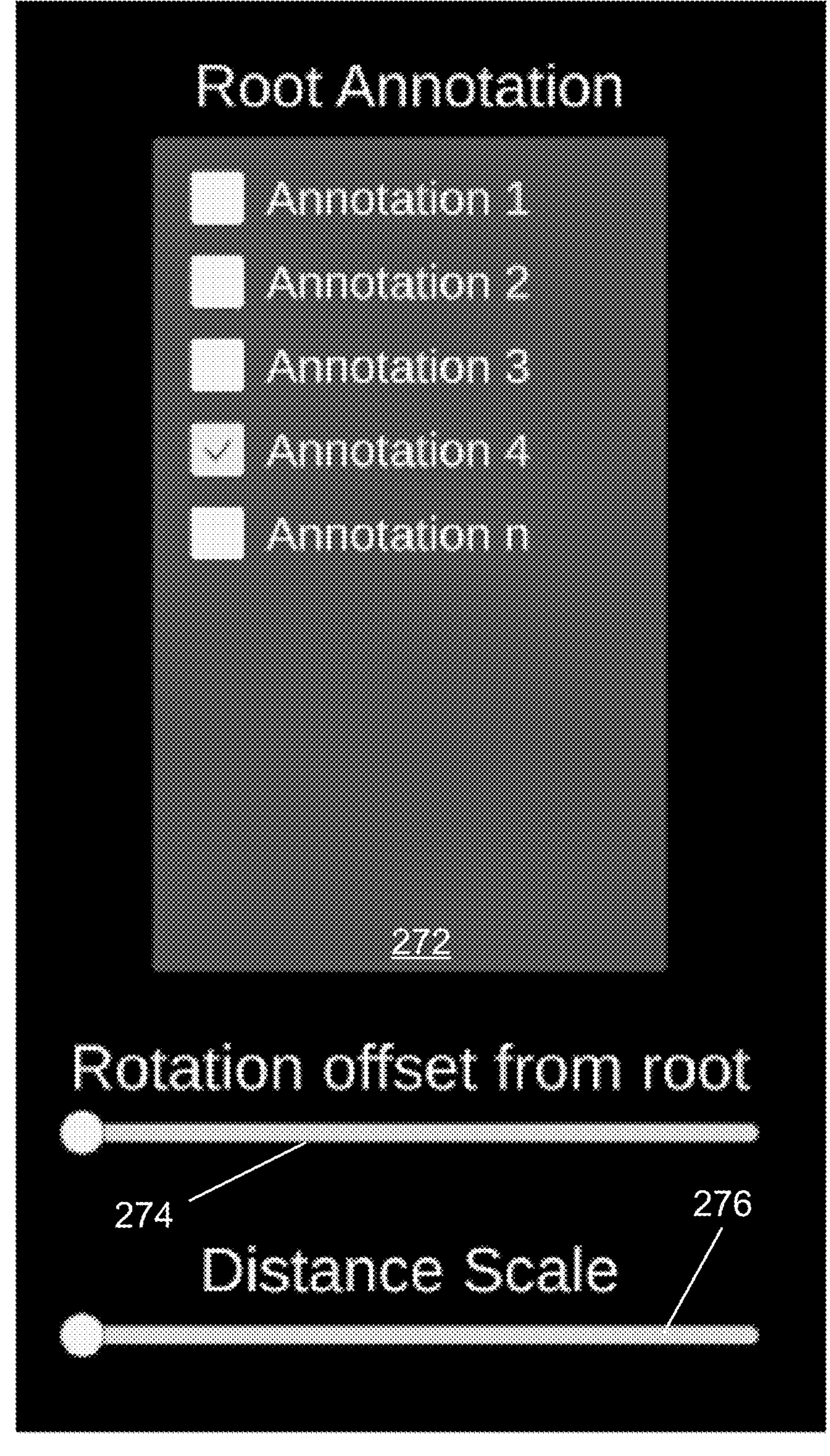
FIG. 2D is a screenshot illustrating an annotation rotation and scaling interface where the AR explorer can change the location of proximate annotations zooming in or out and/or rotating the annotations based on a root annotation, according to an embodiment of the present invention.

FIG. 2C is a screenshot illustrating a View List interface 260 that displays a list of annotations in the current session, according to an embodiment of the present invention. In this embodiment, the AR explorer is able to see the annotation name, the date that it was created, whether it was created by an AR explorer or a VR user, and the coordinates of the annotation. FIG. 2D is a screenshot illustrating an annotation rotation and scaling interface 270 where the AR explorer can change the location of proximate annotations zooming in or out and/or rotating the annotations based on a root annotation, according to an embodiment of the present invention. An annotation selection pane 272 allows the AR explorer to select the root annotation from a list of annotations. A rotation offset from root slider 274 lets the AR explorer rotate the other annotations around the root annotation. A distance scale slider 276 allows the AR explorer to change the scale of the other annotations relative to the root annotation.

FIG. 3A is a screenshot illustrating a VR user interface 300, according to an embodiment of the present invention. VR user interface 300 includes some or all of the same buttons as the AR explorer interface in menu 310 in some embodiments (e.g., AR explorer interface 200). In this embodiment, VR user interface 300, via menu 310, also allows the user to load a 3D model, and optionally GPS coordinates of this model, to automatically place the 3D model on top of the VR map at its geocoordinates. The user can then manually move this object to further align the model with the map. Measure distance is used to measure the actual distance between two points on the VR map. The VR user can also change the date and time of the simulation to view different lighting effects on the environment at different times in some embodiments. Slider 320 allows the VR user to change the time of day over a 24 hour period. Gear icon 330 allows the VR user to change the date.

FIG. 3B illustrates a portion of VR user interface 300 of FIG. 3A with an annotation 340, according to an embodiment of the present invention. Annotation 340 allows the VR user to add a title and an associated description. Navigation button 350 allows the VR user to move the location of annotation 340 on the map. Delete button 360 allows the VR user to delete the annotation and record button 370 allows the VR user to record an audio recording for the annotation.

Per the above, AI/ML may be used by AR applications in some embodiments. Various types of AI/ML models may be trained and deployed without deviating from the scope of the invention. For instance, FIG. 4A illustrates an example of a neural network 400 that has been trained to recognize graphical elements in an image to augment AR or VR, according to an embodiment of the present invention. Here, neural network 400 receives pixels of a screenshot image of a 3820×2160 image as input for input "neurons" 1 to I of the input layer. In this case, I is 8,251,200, which is the total number of pixels in the image (e.g., an image from a video from an AR headset).

Neural network 400 includes a number of hidden layers. Both deep learning neural networks (DLNNs) and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 400.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 4A, pixels provided as the input layer are fed as inputs to the J neurons of hidden layer 1. However, in some embodiments, other inputs may be provided, such as locations, audio recordings a person or pet to learn to mimic, text produced by a person to mimic, images, videos, real world models, virtual world models, geofencing constraints, real world object information, etc. While all pixels are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. It should be noted that numbers of neurons I, J, K, and L are not necessarily equal, and thus, any desired number of layers may be used for a given layer of neural network 400 without deviating from the scope of the invention. Indeed, in certain embodiments, the types of neurons in a given layer and/or between different layers may not all be the same.

Neural network 400 is trained to provide classification and locations of objects in the image, as well as confidence scores for these predictions as outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored.

It should be noted that neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative ∞ and positive ∞, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 4B:
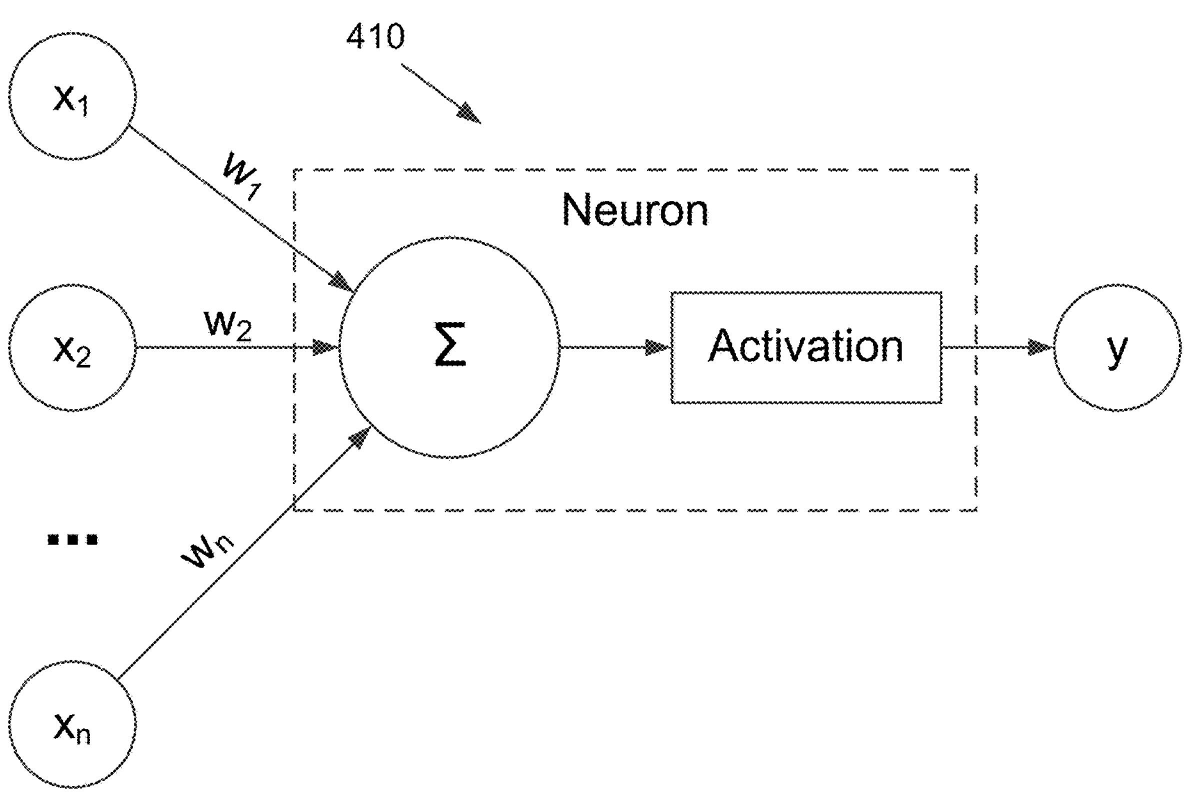
FIG. 4B illustrates an example of a neuron, according to an embodiment of the present invention.

An example of a neuron 410 is shown in FIG. 4B. Inputs $x_1, x_2, \ldots, x_n$ from a preceding layer are assigned respective weights $w_1, w_2, \ldots, w_n$. Thus, the collective input from preceding neuron 1 is $w_1x_1$. These weighted inputs are used for the neuron's summation function modified by a bias, such as:

$$\sum_{i=1}^{m}(w_i x_i) + \text{bias} \quad (1)$$

This summation is compared against an activation function $f(x)$ to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \quad (2)$$

The output y of neuron 410 may thus be given by:

$$y = f(x)\sum_{i=1}^{m}(w_i x_i) + \text{bias} \quad (3)$$

In this case, neuron 410 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the most accurate answers to user inquiries based on associated metrics). During training, various labeled data is fed through neural network 400. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \ldots f_1(W_1 x + b_1) \ldots ) + b_{N-1}) + b_N) \quad (4)$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j)=f_j'(n_j)$, where $n_j$ is the network activity at layer j (i.e., $n_j=W_j o_{j-1}+b_j$) where $o_j=f_j(n_j)$ and the apostrophe ' denotes the derivative of the activity function $f$.

The weight updates may be computed via the formulae:

$$d_j = \begin{cases} (o - t) \circ p_j(n_j), & j = N \\ W_{j+1}^T d_{j+1} \circ p_j(n_j), & j < N \end{cases} \quad (5)$$

$$\frac{\partial E}{\partial W_{j+1}} = d_{j+1}(o_j)^T \quad (6)$$

$$\frac{\partial E}{\partial b_{j+1}} = d_{j+1} \quad (7)$$

$$W_j^{new} = W_j^{old} - \eta \frac{\partial E}{\partial W_j} \quad (8)$$

$$b_j^{new} = b_j^{old} - \eta \frac{\partial E}{\partial b_j} \quad (9)$$

where $\circ$ denotes a Hadamard product (i.e., the element-wise product of two vectors), $^T$ denotes the matrix transpose, and $o_j$ denotes $f_j(W_j o_{j-1}+b_j)$, with $o_0=x$. Here, the learning rate η is chosen with respect to machine learning considerations. Below, η is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data, but does not perform well on other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. This may collectively allow the AI/ML models to perform better than a single model alone.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Natural language processing (NLP) techniques such as word2vec, BERT, GPT-3, Open AI, etc. may be used in some embodiments to facilitate semantic understanding and provide more accurate and human-like answers. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

Figure 5:
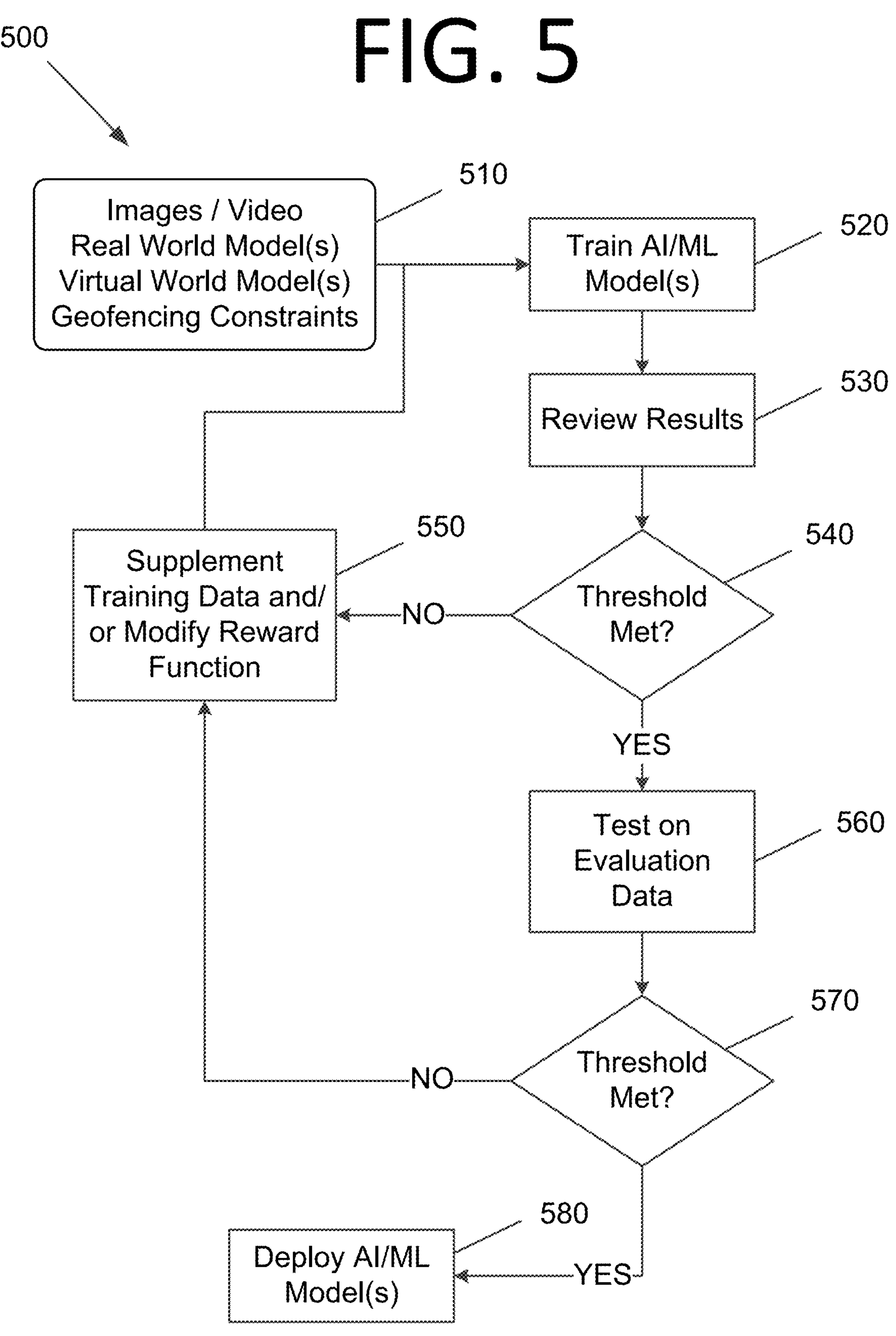
FIG. 5 is a flowchart illustrating a process for training AI/ML model(s), according to an embodiment of the present invention.

FIG. 5 is a flowchart illustrating a process 500 for training AI/ML model(s), according to an embodiment of the present invention. In some embodiments, the AI/ML model(s) may be generative AI model(s). The neural network architecture of AI/ML models typically includes multiple layers of neurons, including input, output, and hidden layers. See FIGS. 4A and 4B, for example. The input layer receives the input(s) and the output layer generates the response(s). The hidden layers in between process the input data and generate intermediate representations of the input that are used to generate the output. These hidden layers can include various types of neurons, such as convolutional neurons, recurrent neurons, and/or transformer neurons.

The training process begins with providing images/video, real world model(s) for AR, virtual world models for VR, geofencing constraints, etc., whether labeled or unlabeled, at 510 to train the AI/ML model(s). The AI/ML model(s) are then trained over multiple epochs at 520 and results are reviewed at 530. While various types of AI/ML models may be used, LLMs and other generative AI models are typically trained using a process called "supervised learning", which is also discussed above. Supervised learning involves providing the model with a large dataset, which the model uses to learn the relationships between the inputs and outputs. During the training process, the model adjusts the weights and biases of the neurons in the neural network to minimize the difference between the predicted outputs and the actual outputs in the training dataset.

One aspect of the models in some embodiments is the use of transfer learning. For instance, transfer learning may take advantage of a pretrained model, such as ChatGPT, which is fine-tuned on a specific task or domain in step 520. This allows the model to leverage the knowledge already learned from the pretraining phase and adapt it to a specific application via the training phase of step 520.

The pretraining phase involves training the model on an initial set of training data that may be more general. During this phase, the model learns relationships in the data. In the fine-tuning phase (e.g., performed during step 520 in addition to or in lieu of the initial training phase in some embodiments if a pretrained model is used as the initial basis for the final model), the pretrained model is adapted to a specific task or domain by training the model on a smaller dataset that is specific to the task. For instance, in some embodiments, the model may be focused on mimicking the behavior of a human or a pet for VR explorer applications. Fine-tuning allows the model to learn the nuances of the task, such as the specific vocabulary and syntax, certain graphical characteristics, certain data formats, etc., without requiring as much data as would be necessary to train the model from scratch. By leveraging the knowledge learned in the pretraining phase, the fine-tuned model can achieve state-of-the-art performance on specific tasks with relatively little additional training data.

If the AI/ML model(s) fail to meet desired confidence threshold(s) at 540 (i.e., different AI/ML models may have different desired minimum confidence thresholds), the training data is supplemented and/or the reward function is modified to help the AI/ML model(s) achieve their objectives better at 550 and the process returns to step 520. If the AI/ML model(s) meet the confidence threshold(s) at 540, the AI/ML model(s) are tested on evaluation data at 560 to ensure that the AI/ML model(s) generalize well and that the AI/ML model(s) are not over fit with respect to the training data. The evaluation data includes information that the AI/ML model(s) have not processed before. If the confidence threshold(s) are met at 570 for the evaluation data, the AI/ML model(s) are deployed at 580. If not, the process returns to step 550 and the AI/ML model(s) are trained further.

FIG. 6 is an architectural diagram illustrating a computing system 600 configured to provide combined AR and/or VR with a feedback loop, or aspects thereof, according to an embodiment of the present invention. In some embodiments, computing system 600 may be one or more of the computing systems depicted and/or described herein, such as those of FIG. 1. Computing system 600 includes a bus 605 or other communication mechanism for communicating information, and processor(s) 610 coupled to bus 605 for processing information. Processor(s) 610 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 610 may also have multiple processing cores, and at least some of the cores may be configured to perform specific functions. Multi-parallel processing may be used in some embodiments. In certain embodiments, at least one of processor(s) 610 may be a neuromorphic circuit that includes processing elements that mimic biological neurons. In some embodiments, neuromorphic circuits may not require the typical components of a Von Neumann computing architecture.

Computing system 600 further includes a memory 615 for storing information and instructions to be executed by processor(s) 610. Memory 615 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 610 and may include volatile media, non-volatile media, or both. The media may also be removable, non-removable, or both.

Additionally, computing system 600 includes a communication device 620, such as a transceiver, to provide access to a communications network via a wireless and/or wired connection. In some embodiments, communication device 620 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 620 may include one or more antennas that are singular, arrayed, phased, switched, beamforming, beamsteering, a combination thereof, and or any other antenna configuration without deviating from the scope of the invention.

Processor(s) 610 are further coupled via bus 605 to a display 625, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 625 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 630 and a cursor control device 635, such as a computer mouse, a touchpad, etc., are further coupled to bus 605 to enable a user to interface with computing system 600. However, in certain embodiments, a physical keyboard and mouse may not be present, and the user may interact with the device solely through display 625 and/or a touchpad (not shown). Any type and combination of input devices may be used as a matter of design choice. In certain embodiments, no physical input device and/or display is present. For instance, the user may interact with computing system 600 remotely via another computing system in communication therewith, or computing system 600 may operate autonomously.

Memory 615 stores software modules that provide functionality when executed by processor(s) 610. The modules include an operating system 640 for computing system 600. The modules further include an AR and/or VR module 645 that is configured to perform all or part of the processes described herein or derivatives thereof. Computing system 600 may include one or more additional functional modules 650 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 7 is a flowchart illustrating a process 700 for providing combined AR and VR with a feedback loop, or aspects thereof, according to an embodiment of the present invention. The process begins with downloading annotations and/or 3D models by an AR application at 710 and by a VR application at 720. An AR user then runs the AR application at 730 and a VR user runs the VR application at 740. In some embodiments, the annotations and/or models may be downloaded after the AR application and the VR application begin running. The AR application provides the current location of its user to the VR application at 750. This may be via GPS initially in some embodiments.

While there are no annotation changes at 760, the AR application periodically sends location updates at 750 (e.g., coordinate updates from sensors of the computing system that is running the AR application, allowing "displacement" of the AR explorer from the initial position to be determined). The location updates may be performed by the AR application updating a database and the VR application periodically polling from the database, the VR application receiving updates from the AR application through a publication/subscription system, a direct Transmission Control Protocol/Internet Protocol (TCP/IP) connection between the AR application and the VR application, etc. However, if the AR user or VR user creates a new annotation or modifies an existing annotation, the respective AR application or VR application sends the new or updated annotation to a server at 770, which stores the new annotation or modified version of the existing annotation in a database at 780. In some embodiments, the new or updated annotation is then sent to the other of the AR application or the VR application (i.e., the application that did not create or modify the annotation) at 790 so both the AR application and the VR application have the latest version of the annotations.

Figure 8:
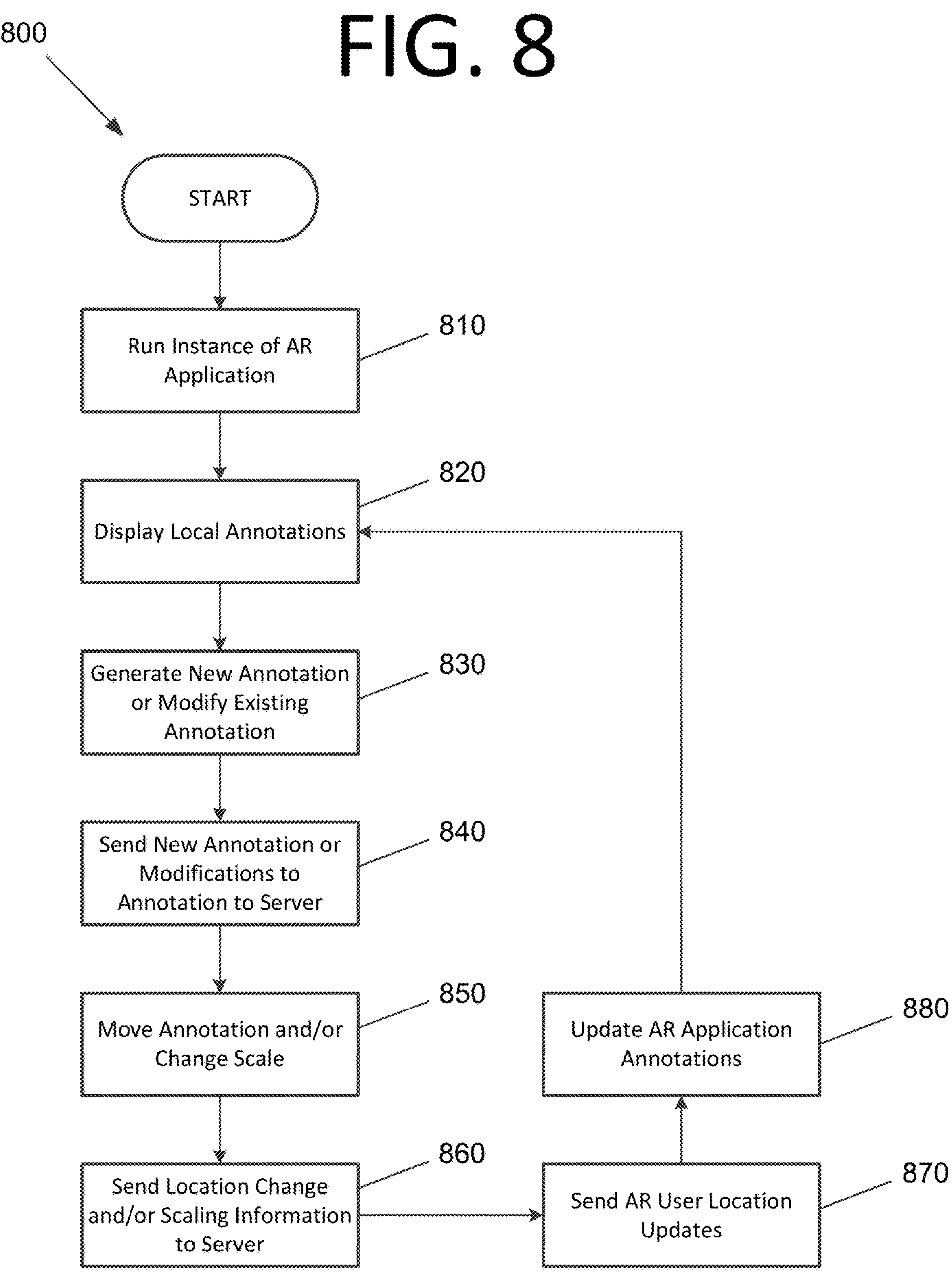
FIG. 8 is a flowchart illustrating a process for providing AR with a feedback loop, or aspects thereof, according to an embodiment of the present invention.

FIG. 8 is a flowchart illustrating a process 800 for providing AR with a feedback loop, or aspects thereof, according to an embodiment of the present invention. The process begins with running an instance of an AR application at 810. Annotations local to the AR user are displayed in the AR computing system at 820. The annotations are linked to one or more respective real world locations as holographic projections. The annotations are linked to the respective real world locations by a coordinate system. The annotations are also associated with corresponding locations in a VR application. For instance, in some embodiments, GPS coordinates for annotations are stored in a database. These annotations may ultimately be converted into a left handed coordinate system such as the Unity™ coordinate system, a right handed coordinate system such as the Blender™ coordinate system, or any other non-GPS coordinate system without deviating from the scope of the invention, to display the annotations to the user, but this position is not necessarily stored in the database since it will change depending on where the AR application is launched from or where the "reference anchor point" is. The geocoordinates, however, typically stay consistent. In some embodiments, the respective locations of the annotations are linked to respective virtual locations in the VR application using respective synthetic square markers (e.g., ArUco markers). In certain embodiments, the annotations include indications of which AR users and VR users made corresponding edits to the annotations and who created the annotations.

When the AR user generates a new annotation or modifies an existing annotation at 830, the AR application sends the new or modified annotation to a server at 840 so other instances of the AR application and instances of the VR application can be updated with the new or modified annotation. The AR user may choose to move an annotation and/or change the scale of other annotations relative to a root annotation at 850. An update pertaining to this action is then sent to the server at 860 in case such changes need to be made for other AR application instances. The updates of the AR user's current location are sent at 870, and annotations are updated in the AR application if changed by other users at 880.

FIG. 9 is a flowchart illustrating a process 900 for providing VR with a feedback loop, or aspects thereof, according to an embodiment of the present invention. The process begins with running an instance of a VR application at 810. Annotations local to the virtual location that the VR user is viewing are displayed on the VR computing system at 920. The annotations correspond to respective real world locations.

When the VR user generates a new annotation or modifies an existing annotation at 930, the VR application sends the new or modified annotation to a server at 940 so instances of the AR application and other instances of the VR application can be updated with the new or modified annotation. The updates of an AR user's current location are received and displayed at 950, and annotations are updated in the VR application if changed by other users at 960.

The process steps performed in FIGS. 5 and 7-9 may be performed by computer program(s), encoding instructions for the processor(s) to perform at least part of the process(es) described in FIGS. 5 and 7-9, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 610 of computing system 600 of FIG. 6) to implement all or part of the process steps described in FIGS. 5 and 7-9, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for providing augmented reality (AR) with a feedback loop, comprising:

running an instance of an AR application, by a computing system;

displaying one or more annotations in the AR application linked to one or more respective real world locations as holographic projections on a display of the computing system, by AR application;

receiving a selection of a root annotation to serve as an anchor, by the AR application; and rotating relative positions of one or more other annotations about the root annotation, changing a scale distance of the one or more other annotations relative to the root annotation, or both, responsive to user input, by the AR application, wherein the one or more annotations are linked to the one or more respective real world locations by a coordinate system, and the one or more annotations are also associated with corresponding locations in a virtual reality (VR) application.

2. The computer-implemented method of claim 1, further comprising:

generating a new annotation, by the AR application; and sending, by the AR application, information pertaining to the generated annotation to a server accessible by at least one other instance of the AR application, at least one instance of the VR application, or both.

3. The computer-implemented method of claim 1, further comprising:

updating an annotation of the one or more annotations, by the AR application; and sending, by the AR application, information pertaining to the updated annotation to a server accessible by at least one other instance of the AR application, at least one instance of the VR application, or both.

4. The computer-implemented method of claim 1, wherein the one or more annotations comprise a voice recording, an image, a text description, a title, or any combination thereof.

5. The computer-implemented method of claim 1, wherein the computing system is an AR headset, a smart phone, or a tablet.

6. The computer-implemented method of claim 1, wherein the respective real world locations of the one or more annotations are linked to one or more respective virtual locations in the VR application using respective synthetic square markers.

7. The computer-implemented method of claim 1, wherein an annotation of the one or more annotations is generated by the AR application and another annotation of the one or more annotations is generated by the VR application.

8. The computer-implemented method of claim 1, wherein the one or more annotations are visible at the corresponding locations in both the AR application and the VR application.

9. The computer-implemented method of claim 8, wherein the one or more annotations are editable by both the AR application and the VR application.

10. The computer-implemented method of claim 8, wherein the at least one annotation comprises indications of which AR users and VR users made corresponding edits to the one or more annotations.

11. The computer-implemented method of claim 1, further comprising:

displaying a map, by the AR application, wherein the map comprises indications of the respective real world locations of the one or more annotations.

12. The computer-implemented method of claim 11, wherein the AR application comprises controls that cause the map to be moved around and manipulated when a user of the instance of the AR application interacts with the controls.

13. The computer-implemented method of claim 11, wherein the indications of the one or more annotations are color coded to indicate statuses associated with the respective annotations.

14. The computer-implemented method of claim 1, wherein respective sizes of the one or more annotations correspond to respective distances of the one or more annotations to the computing system running the instance of the AR application.

15. The computer-implemented method of claim 1, further comprising:

facilitating selection of an annotation of the one or more annotations, by the AR application, wherein an interface of the AR application comprises a compass indicating a direction of the selected annotation.

16. The computer-implemented method of claim 15, wherein the AR application is configured to string multiple annotations together as waypoints to be visited in order.

17. The computer-implemented method of claim 1, further comprising:

displaying a menu comprising the one or more annotations on the display of the computing system, by the AR application, the menu comprising annotation names, a user that created each annotation, coordinates of each annotation, when each annotation was made, a current distance from the computing system to each annotation, relative locations of each annotation, or any combination thereof.

18. The computer-implemented method of claim 1, further comprising:

receiving a selection of a location where an annotation of the one or more annotations should be in the real world, by the AR application; and moving the selected annotation to the selected location, by the AR application.

19. The computer-implemented method of claim 1, further comprising:

tracking a current location of the computing system, by the AR application; and transmitting the current location of the computing system to a server to be updated in instances of the VR application, by the AR application.

20. The computer-implemented method of claim 1, further comprising:

displaying one or more three-dimensional (3D) models as holograms on the display of the computing system, by the AR application, wherein the one or more 3D models comprise rules for actions of the one or more 3D models.

21. The computer-implemented method of claim 20, wherein the rules for the actions comprise geofencing rules, non-fungible tokens (NFTs), rules for whether the respective 3D model can move through objects, or any combination thereof.

22. The computer-implemented method of claim 20, wherein at least one 3D model of the one or more 3D models is or comprises an artificial intelligence (AI)/machine learning (ML) model, the AI/ML model configured to perform path detection in the real world, operate within a swarm of AI/ML models to accomplish group objectives, or mimic behavior of a human or a pet.

23. The computer-implemented method of claim 1, further comprising:

displaying an application window for an application on the display of the computing system, by the AR application, wherein the application is common to the AR application and the VR application.

24. A non-transitory computer-readable medium storing a computer program for providing augmented reality (AR) with a feedback loop, the computer program configured to cause at least one processor to:

run an instance of an AR application;

display one or more annotations linked to one or more respective real world locations as holographic projections;

receive a selection of a root annotation to serve as an anchor; and rotate relative positions of one or more other annotations about the root annotation, change a scale distance of the one or more other annotations relative to the root annotation, or both, responsive to user input, wherein the one or more annotations are linked to the one or more respective real world locations by a coordinate system, the one or more annotations are also associated with corresponding locations in a virtual reality (VR) application and visible at the corresponding locations in both the AR application and the VR application, and the one or more annotations comprise a voice recording, an image, a text description, a title, or any combination thereof.

25. The non-transitory computer-readable medium of claim 24, wherein the computer program is further configured to cause the at least one processor to:

generate a new annotation or update an annotation of the one or more annotations; and send information pertaining to the generated new annotation or the updated annotation to a server accessible by at least one other instance of the AR application, at least one instance of the VR application, or both.

26. The non-transitory computer-readable medium of claim 24, wherein the one or more annotations are editable by both the AR application and the VR application.

27. The non-transitory computer-readable medium of claim 24, wherein the computer program is further configured to cause the at least one processor to:

display a map comprising indications of the respective real world locations of the one or more annotations, wherein the AR application comprises controls that cause the map to be moved around and manipulated when a user of the instance of the AR application interacts with the controls.

28. The non-transitory computer-readable medium of claim 24, wherein respective sizes of the one or more annotations correspond to respective distances of the one or more annotations to the computing system running the instance of the AR application.

29. The non-transitory computer-readable medium of claim 24, wherein the computer program is further configured to cause the at least one processor to:

facilitate selection of an annotation of the one or more annotations, wherein an interface of the AR application comprises a compass indicating a direction of the selected annotation.

30. The non-transitory computer-readable medium of claim 24, wherein the computer program is further configured to cause the at least one processor to:

display a menu comprising the one or more annotations, the menu comprising annotation names, a user that created each annotation, coordinates of each annotation, when each annotation was made, a current distance from the computing system to each annotation, relative locations of each annotation, or any combination thereof.

31. The non-transitory computer-readable medium of claim 24, wherein the computer program is further configured to cause the at least one processor to:

receive a selection of a location where an annotation of the one or more annotations should be in the real world; and move the selected annotation to the selected location.

32. The non-transitory computer-readable medium of claim 24, wherein the computer program is further configured to cause the at least one processor to:

display one or more three-dimensional (3D) models as holograms, wherein the one or more 3D models comprise rules for actions of the one or more 3D models, at least one 3D model of the one or more 3D models is or comprises an artificial intelligence (AI)/machine learning (ML) model, and the AI/ML model is configured to perform path detection in the real world, operate within a swarm of AI/ML models to accomplish group objectives, or mimic behavior of a human or a pet.

33. The non-transitory computer-readable medium of claim 24, wherein the computer program is further configured to cause the at least one processor to:

display an application window for an application on the display of the computing system, wherein the application is common to the AR application and the VR application.

34. A computing system, comprising:

memory storing computer program instructions for providing augmented reality (AR) with a feedback loop; and at least one processor configured to execute the computer program instructions, wherein the computer program instructions are configured to cause the at least one processor to:

display one or more annotations in an AR application linked to one or more respective real world locations as holographic projections, receive a selection of a root annotation to serve as an anchor, rotate relative positions of one or more other annotations about the root annotation, change a scale distance of the one or more other annotations relative to the root annotation, or both, responsive to user input, generate a new annotation or update an annotation of the one or more annotations, and send information pertaining to the generated new annotation or the updated annotation to a server accessible by at least one other instance of the AR application, at least one instance of a virtual reality (VR) application, or both, wherein the one or more annotations are linked to the one or more respective real world locations by a coordinate system, and the one or more annotations are also associated with corresponding locations in the VR application and visible at the corresponding locations in both the AR application and the VR application.

35. The computing system of claim 34, wherein the computer program instructions are further configured to cause the at least one processor to:

display a map comprising indications of the respective real world locations of the one or more annotations, wherein the AR application comprises controls that cause the map to be moved around and manipulated when a user of the instance of the AR application interacts with the controls.

36. The computing system of claim 34, wherein the computer program instructions are further configured to cause the at least one processor to:

facilitate selection of an annotation of the one or more annotations, wherein an interface of the AR application comprises a compass indicating a direction of the selected annotation.

37. The computing system of claim 34, wherein the computer program instructions are further configured to cause the at least one processor to:

display a menu comprising the one or more annotations, the menu comprising annotation names, a user that created each annotation, coordinates of each annotation, when each annotation was made, a current distance from the computing system to each annotation, relative locations of each annotation, or any combination thereof.

38. The computing system of claim 34, wherein the computer program instructions are further configured to cause the at least one processor to:

receive a selection of a location where an annotation of the one or more annotations should be in the real world; and move the selected annotation to the selected location.

* * * * *